(12) United States Patent
Song et al.

(10) Patent No.: US 8,184,080 B2
(45) Date of Patent: May 22, 2012

(54) LIQUID CRYSTAL DISPLAY AND DRIVING METHOD THEREOF

(75) Inventors: Jang-Kun Song, Seoul (KR);
Chang-Hun Lee, Suwon (KR);
Hak-Sun Chang, Seoul (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 638 days.

(21) Appl. No.: 10/520,352

(22) PCT Filed: Sep. 17, 2002

(86) PCT No.: PCT/KR02/01743
§ 371 (c)(1),
(2), (4) Date: Feb. 13, 2006

(87) PCT Pub. No.: WO2004/006008
PCT Pub. Date: Jan. 15, 2004

(65) Prior Publication Data
US 2006/0244705 A1    Nov. 2, 2006

(30) Foreign Application Priority Data
Jul. 5, 2002 (KR) .................................. 2002/38920

(51) Int. Cl.
*G09G 3/36* (2006.01)

(52) U.S. Cl. ........................................................ 345/94

(58) Field of Classification Search ............. 345/87–100
See application file for complete search history.

(56) References Cited

U.S. PATENT DOCUMENTS

| 5,119,089 | A | | 6/1992 | Khalil ................. 340/855.2 |
| 5,233,338 | A | * | 8/1993 | Surguy ..................... 345/88 |
| 5,546,102 | A | | 8/1996 | Scheffer et al. ........... 345/100 |
| 5,790,089 | A | | 8/1998 | Ono et al. .................. 345/94 |
| 5,844,539 | A | * | 12/1998 | Kitagawa ................ 345/100 |
| 6,219,019 | B1 | | 4/2001 | Hasegawa et al. |
| 6,232,939 | B1 | | 5/2001 | Saito et al. ................. 345/93 |
| 6,236,388 | B1 | * | 5/2001 | Iida et al. ................. 345/698 |
| 6,392,620 | B1 | * | 5/2002 | Mizutani et al. ........... 345/88 |

(Continued)

FOREIGN PATENT DOCUMENTS

JP            04-309995         11/1992

(Continued)

*Primary Examiner* — Bipin Shalwala
*Assistant Examiner* — Steven E Holton
(74) *Attorney, Agent, or Firm* — F. Chau & Associates, LLC

(57) ABSTRACT

The present invention relates a liquid crystal display. The liquid crystal display includes a liquid crystal panel assembly including a plurality of pixels arranged in a matrix, a gate driver applying gate signals to the pixels for application of data signals to the pixels, a data driver selecting gray voltages corresponding to gray signals and applying the selected gray voltages to the pixels as the data signals, and a signal controller providing the gray signals and control signals for controlling the gray signals for the gate driver and the data driver. The data signals include normal data signals and a black data signal. The data driver alternately applies the normal data signals and the black data signal to the pixels under control of the signal controller. A scanning direction of the normal data signals is opposite in adjacent frames. Accordingly, respective holding periods of all the pixels for the normal data signals and the black data signals are uniform, and then image quality of the LCD is uniformed to be improved.

18 Claims, 9 Drawing Sheets

U.S. PATENT DOCUMENTS

| | | | |
|---|---|---|---|
| 6,396,469 B1 * | 5/2002 | Miwa et al. | 345/87 |
| 6,693,618 B2 * | 2/2004 | Son et al. | 345/99 |
| 6,947,034 B2 * | 9/2005 | Kwon | 345/204 |
| 2002/0044117 A1 * | 4/2002 | Matsumura et al. | 345/87 |
| 2003/0090449 A1 * | 5/2003 | Arimoto et al. | 345/87 |

FOREIGN PATENT DOCUMENTS

| | | |
|---|---|---|
| JP | 05-191752 | 7/1993 |
| JP | 07-140933 | 6/1995 |
| JP | 07-146668 | 6/1995 |
| JP | 11119189 | 4/1999 |
| JP | 11237606 | 8/1999 |
| JP | 11258573 | 9/1999 |
| JP | 2001-060078 | 3/2001 |
| JP | 2001281627 | 10/2001 |
| JP | 2001356738 | 12/2001 |
| JP | 2002-055657 | 2/2002 |
| JP | 2002-072968 | 3/2002 |
| JP | 2003005153 | 1/2003 |
| JP | 2003177716 | 6/2003 |
| JP | 2003215535 | 7/2003 |

* cited by examiner

LIQUID CRYSTAL DISPLAY AND DRIVING METHOD THEREOF

BACKGROUND OF THE INVENTION (a) Field of the Invention

The present invention relates to a liquid crystal display and a driving method thereof.

(b) Description of the Related Art

A typical liquid crystal display ("LCD") includes a pair of panels and a liquid crystal layer with dielectric anisotropy, which is disposed between the two panels. The liquid crystal layer is applied with electric field, and the transmittance of light passing through the liquid crystal layer is adjusted by controlling the electric field, thereby obtaining desired images. The LCD is the most commonly used one of flat panel displays ("FPDs") handy to carry. Among the various types of LCDs, a thin film transistor liquid crystal display ("TFT-LCD") employing the thin film transistors as switching elements is most widely used.

In a conventional TFT-LCD, because liquid crystal molecules have slow response time, images may be unclear and blurred. To solve the problem, an impulsive driving inserting black images has been adopted.

The impulsive driving includes an impulsive emission type and a cyclic resetting type, the former regularly turning on/off a backlight to darken a screen and the latter regularly applying black data signals.

However, these driving techniques have a problem of deteriorated image quality due to afterimage or flicker since response time of the liquid crystal molecules or the backlight is slow. More specifically, the latter technique has a problem of reduced application time of the data signals in a frame.

SUMMARY OF THE INVENTION

A motivation of the present invention is to solve the problems of the conventional art such that the application times of data signals to all pixels are uniform to improve image quality.

A liquid crystal display according to an aspect of the present invention includes: a liquid crystal panel assembly including a plurality of pixels arranged in a matrix; a gate driver applying gate signals to the pixels; a data driver selecting gray voltages corresponding to gray signals and applying the selected gray voltages to the pixels as data signals; and a signal controller providing the gray signals and control signals for controlling the gray signals for the gate driver and the data driver, wherein the data signals include normal data signals and a black data signal, the data driver alternately applies the normal data signals and the black data signal to the pixels under control of the signal controller, and a scanning direction of the normal data signals is opposite in adjacent frames.

The black data signal is simultaneously applied to the pixels.

A liquid crystal display according to another aspect of the present invention includes: a liquid crystal panel assembly including a plurality of scanning areas including a plurality of pixels arranged in a matrix and including respective switching elements connected to a plurality of gate lines and a plurality of data lines; a gate driver applying a voltage for turning on the switching elements to the gate lines; a data driver selecting gray voltages corresponding to gray signals and applying the selected gray voltages to the pixels via the data lines as data signals; and a signal controller providing the gray signals and control signals for controlling the gray signals for the gate driver and the data driver, wherein the gate driver includes a plurality of gate driving devices; the gate driving devices are connected to the gate lines; the pixels in different scanning areas are connected to different gate driving devices through the gate lines; the data signals includes normal data signals and a black data signal; the normal data signals and the black data signal are alternately applied to each scanning area; the normal data signals are applied to one of the scanning areas, and then the black data signal is applied to one of remaining scanning areas except for one of the scanning areas; and scanning of the scanning areas for a previous frame is completed, and then scanning directions within the scanning areas for a next frame are opposite to scanning directions of the previous frame.

The black data signal is simultaneously applied to the pixels in one of the scanning areas.

Preferably, the black data signal applied in a previous step is held on at least one of the scanning areas during scanning of one of the scanning areas.

Moreover, polarity of the normal data signals on adjacent frames is preferably opposite.

The liquid crystal display may be in OCB mode.

A method of driving a liquid crystal display including a plurality of pixels arranged in a matrix, each pixel including a liquid capacitor filled with liquid material, according to another aspect of the present invention includes: a first data voltage application step applying normal data voltages to the pixels in a first direction; a second data voltage application step applying a black data voltage to the pixels; a third data voltage application step applying normal data voltages to the pixels in a second direction; and a fourth data voltage application step applying the black data voltage to the pixels.

Preferably, polarity of the normal data voltages applied in the first data voltage application step is opposite to polarity of the normal data voltage applied in the third data voltage application step, and polarity of the black data voltage applied in the second data voltage application step is opposite to polarity of the black data voltage applied in the fourth data voltage application step.

A method of driving a liquid crystal display including a plurality of pixels arranged in a matrix, each pixel including a liquid capacitor filled with liquid material and including a plurality of areas provided with the pixels, according to another aspect of the present invention includes: a first data voltage application step applying normal data voltages to a first area of the plurality of areas in a first direction; a second data voltage application step applying a black data voltage to a second area following the first area; a third data voltage application step applying normal data voltages to the second area in the first direction; a first repeating step repeating the first data voltage application step to the third data voltage application step for the plurality of areas; a fourth data voltage application step applying normal data voltages to the first area in a second direction; a fifth data voltage application step applying the black data voltage to the second area; a sixth data voltage application step applying normal data voltages to the second area in the second direction; and a second repeating step repeating the fourth data voltage application step to the sixth data voltage application step for the plurality of areas.

Preferably, the first direction is opposite to the second direction.

A liquid crystal display according to the other aspect to the present invention includes including a plurality of pixels, wherein normal data signals and a black data signal are alternately applied to the pixels, and normal data holding periods of the pixels averaged over adjacent two frames is uniform.

Preferably, scanning directions for the adjacent two frames are opposite each other.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Like numerals refer to like elements throughout.

Then, liquid crystal displays according to embodiments of the present invention will be described.

Figure 1:
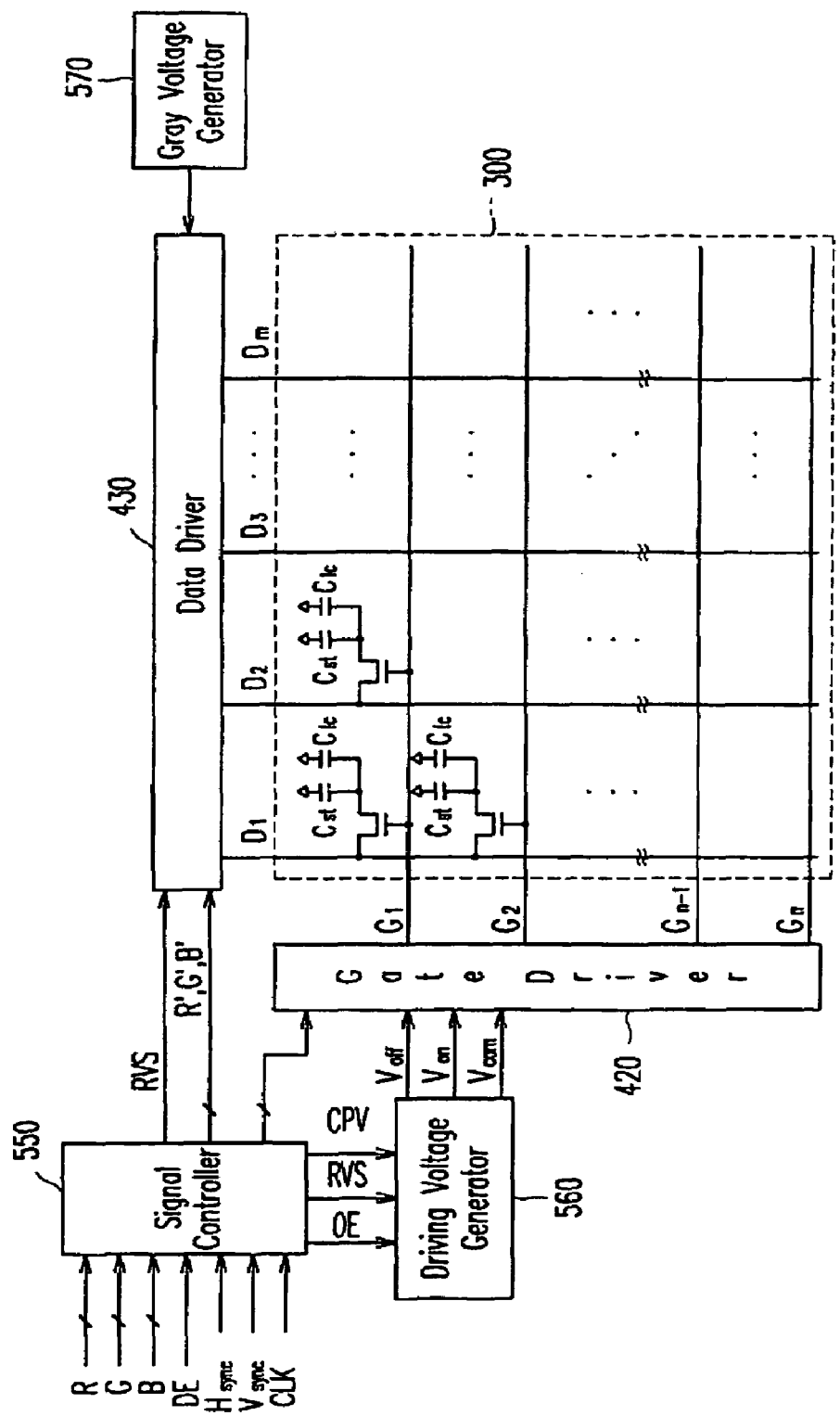
FIG. 1 is a block diagram of an LCD according to an embodiment of the present invention.
Figure 2:
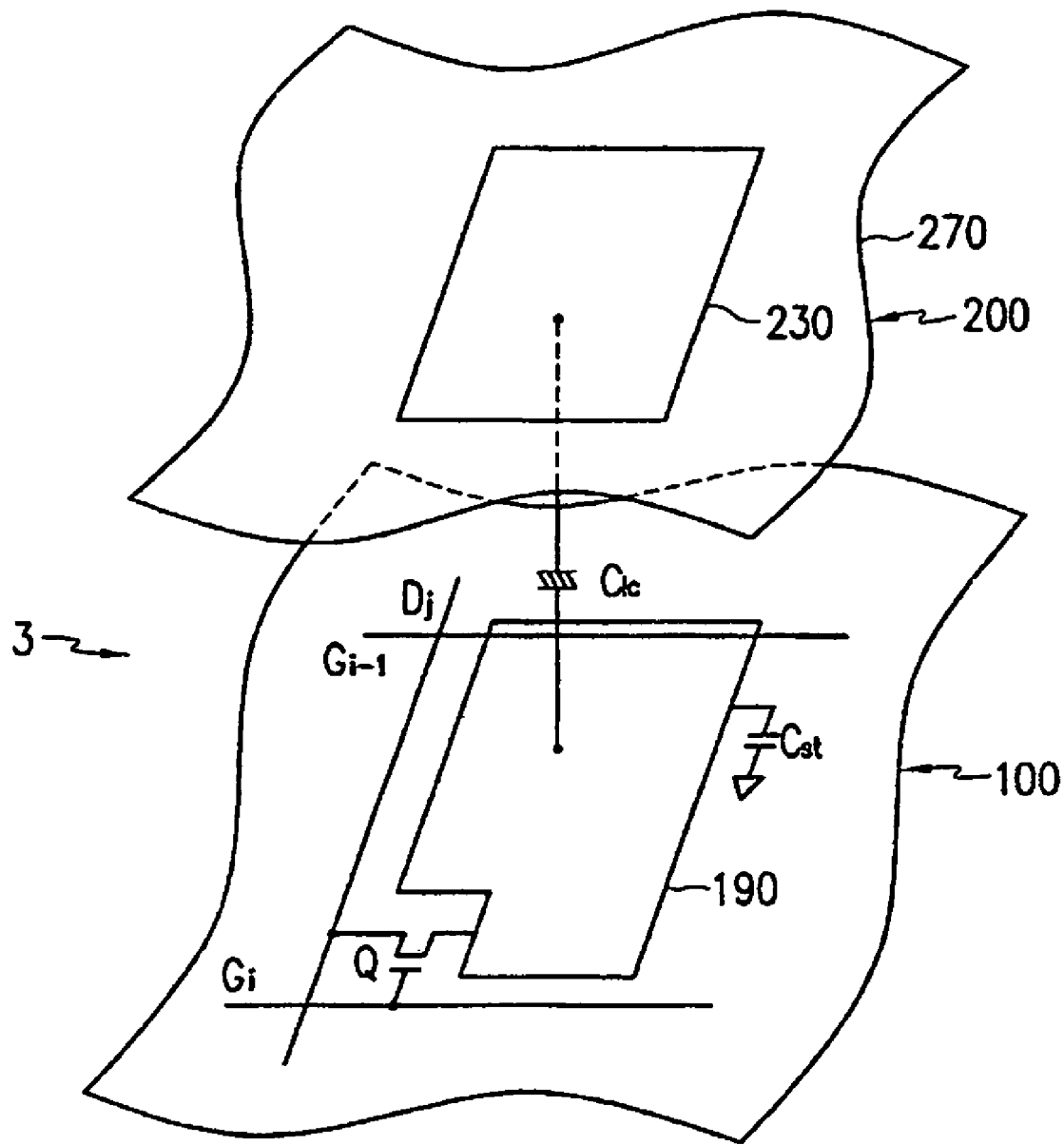
FIG. 2 is an equivalent circuit diagram of a pixel of an LCD according to an embodiment of the present invention.

FIG. 1 is a block diagram of an LCD according to an embodiment of the present invention, and FIG. 2 is an equivalent circuit diagram of a pixel of an LCD according to an embodiment of the present invention.

Referring to FIG. 1, an LCD according to an embodiment of the present invention includes a liquid crystal panel assembly 300, a gate driver 420 and a data driver 430 which are connected to the panel assembly 300, a driving voltage generator 560 connected to the gate driver 420, a gray voltage generator 570 connected to the data driver 430, and a signal controller 550 controlling the above elements.

In view of an equivalent circuit, the panel assembly 300 includes a plurality of signal lines $G_1$-$G_n$ and $D_1$-$D_m$ and a plurality of pixels connected thereto. Each pixel includes a switching element Q connected to the signal lines $G_1$-$G_n$ and $D_1$-$D_m$, and a liquid crystal capacitor $C_{lc}$ and a storage capacitor $C_{st}$ that are connected to the switching element Q. The signal lines $G_1$-$G_n$ and $D_1$-$D_m$ include a plurality of scanning lines or gate lines $G_1$-$G_n$ extending in a row direction and transmitting scanning signals or gate signals, and a plurality of data lines $D_1$-$D_m$ extending in a column direction and transmitting image signals or data signals. The switching element Q has three terminals, a control terminal connected to one of the gate lines $G_1$-$G_n$, an input terminal connected to one of the data lines $D_1$-$D_m$, and an output terminal connected to both the liquid crystal capacitor $C_{lc}$ and the storage capacitor $C_{st}$.

The liquid crystal capacitor $C_{lc}$ is connected between the output terminal of the switching element Q and a reference voltage or a common voltage $V_{com}$. The other terminal of the storage capacitor $C_{st}$ is connected a predetermined voltage such as the reference voltage. However, the other terminal of the storage capacitor $C_{st}$ may be connected to a gate line located just above (referred to as a "previous gate line" hereinafter). The former is referred to as a separate wire type, and the latter is referred to as a previous gate type.

Meanwhile, FIG. 2 schematically shows a structure of a panel assembly 300 according to an embodiment of the present invention. For easy explanation, only a pixel is illustrated in FIG. 2.

As shown in FIG. 2, a panel assembly 300 includes a lower panel 100, an upper panel 200 opposite the lower panel 100, and a liquid crystal layer 3 interposed therebetween. Gate lines $G_i$ and $G_{i-1}$, a data line $D_j$, a switching element Q, and a storage capacitor $C_{st}$ are provided on the lower panel 100. A pixel electrode 190 on the lower panel 100 and a common electrode 270 on the upper panel 200 form two terminals of a liquid crystal capacitor $C_{lc}$. The liquid crystal layer 3 disposed between the two electrodes 190 and 270 functions as dielectric of the liquid crystal capacitor $C_{lc}$. The liquid crystal layer 3 according to this embodiment, for example, may have an optically compensated bend (OCB) type orientation. In this case, the liquid crystal molecules are aligned in a bend mode, where liquid crystal molecules are symmetrically aligned with respect to a mid-plane located between the lower panel 100 and the upper panel 200. The OCB LCD improves response time and view angle, uses the bend orientation of the liquid crystal molecules, which is easily broken upon application of a voltage lower than a predetermined voltage, and may be driven with voltages higher than a threshold voltage (Vc), which do not break the bend alignment.

The pixel electrode 190 is connected to the switching element Q and the common electrode 270 is connected to the common voltage $V_{com}$ and covers entire surface of the upper panel 200.

The orientations of liquid crystal molecules in the liquid crystal layer 3 are changed by the change of electric field generated by the pixel electrode 190 and the common electrode 270. The change of the molecular orientations changes the polarization of light passing through the liquid crystal layer 3, which in turn causes the variation of the transmittance of the light by a polarizer or polarizers (not shown) attached to at least one of the panels 100 and 200.

A separate wire provided on the lower panel 100 and supplied with the reference voltage overlaps the pixel electrode 190 to form a storage capacitor Cst. In the previous gate type, the pixel electrode 190 overlaps its previous gate line Gi-1 via an insulator such that the pixel electrode 190 and the previous gate line Gi-1 form two terminals of the storage capacitor Cst.

FIG. 2 shows a MOS transistor as a switching element, and the MOS transistor is implemented as a thin film transistor ("TFT") including an amorphous silicon or polysilicon channel layer in practical manufacturing process.

Different from FIG. 2, the common electrode 270 may be provided on the lower panel 100. In this case, both the electrodes 190 and 270 have shapes of stripes.

For realizing color display, each pixel can represent a color by providing one of a plurality of red, green and blue color filters 230 in an area corresponding to the pixel electrode 190. The color filter 230 shown in FIG. 2 is provided in the corresponding area of the upper panel 200. Alternatively, the color filter 230 is provided on or under the pixel electrode 190 on the lower panel 100.

Figure 3A:
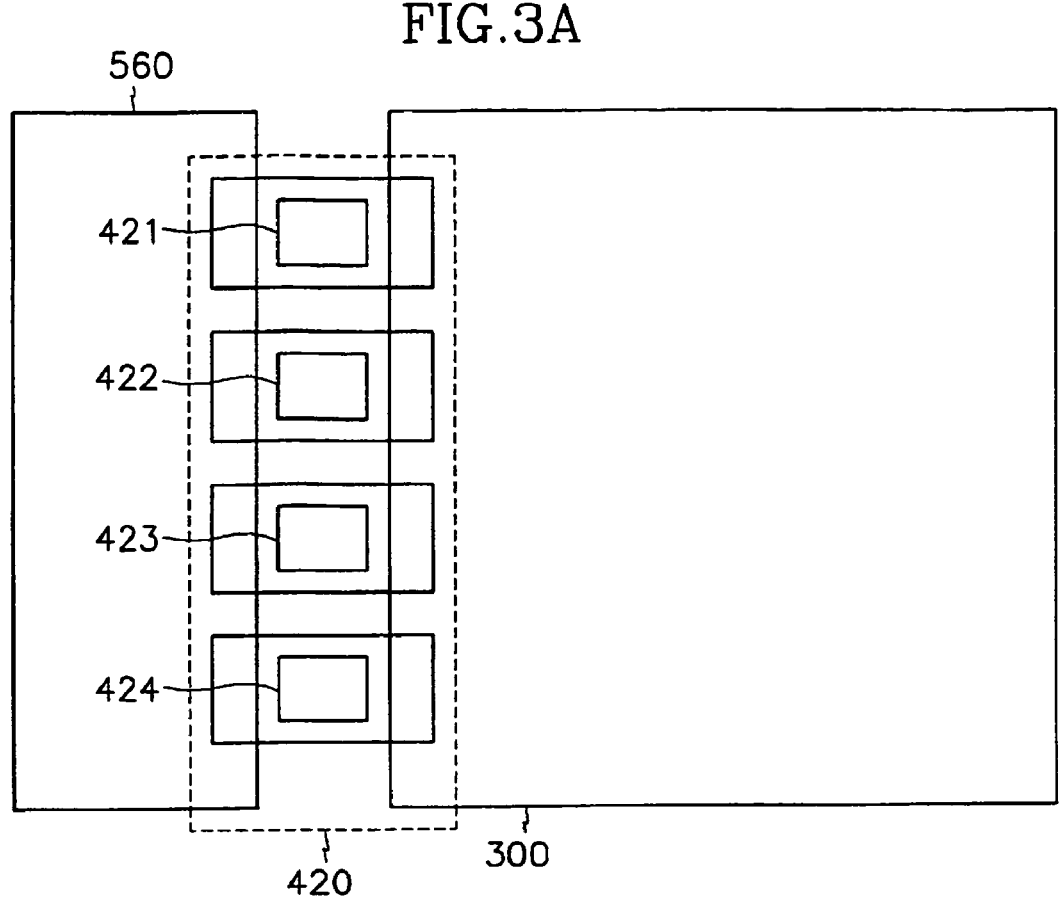
FIG. 3A is a detailed block diagram of a gate driver according to an embodiment of the present invention.

Referring to FIG. 1 again, the gate driver 420 and the data driver 430, which are often called a scanning driver and a source driver, respectively, may include a plurality of gate driving integrated circuits (ICs) and a plurality of data driving ICs, respectively. The ICs are separately placed external to the panel assembly 300 or mounted on the panel assembly 300. Alternatively, the ICs are formed on the panel assembly 300 like the signal lines $G_1$-$G_n$ and $D_1$-$D_m$ and the TFTs Q. In FIG. 3A, the gate driver 420 includes four gate driving ICs 421-424 which are chips mounted on a flexible printed circuit film. Also, each gate driving IC 421-424 is connected to the gate lines via a plurality of wires 500, and the four gate driving ICs 421-424 are connected to all gate lines G1-Gn through wires 500.

Each gate driving IC 421-424 of the gate driver 420 is connected to the gate lines $G_1$-$G_n$ of the panel assembly 300 and applies gate signals to the gate lines $G_1$-$G_n$, each gate signal being a combination of a gate-on voltage $V_{on}$ and a gate off voltage $V_{off}$ from the driving voltage generator 560. In this embodiment of the present invention, the gate signals are applied through the gate lines $G_1$-$G_n$ connected to each gate driving IC 421-424 of the gate driver 420.

The data driver 430 is connected to the data lines $D_1$-$D_n$ of the panel assembly 300 and selects gray voltages from the gray voltage generator 570 to be applied as data signals to the data lines $D_1$-$D_n$.

The gate driver 420, the data driver 430 and the driving voltage generator 560 are controlled by the signal controller 400 connected thereto and located external to the panel assembly 300. The operation will be described in detail.

The signal controller 550 is supplied from an external graphic controller (not shown) with RGB gray signals R, G and B and input control signals controlling the display thereof, for example, a vertical synchronization signal $V_{sync}$, a horizontal synchronization signal $H_{sync}$, a main clock CLK, a data enable signal DE, etc. After generating gate control signals and data control signals on the basis of the input control signals and processing the gray signals R, G and B suitable for the operation of the panel assembly 300, the signal controller 550 provides the gate control signals for the gate driver 420, and the processed gray signals R', G' and B' and the data control signals for the data driver 430.

The gate control signals include a vertical synchronization start signal STV for instructing to begin outputting gate-on pulses (i.e., high sections of the gate signals), a gate clock signal CPV for controlling the output period of the gate-on pulses and a output enable signal OE for defining the widths of the gate-on pulses. Among the gate control signals, the output enable signal OE and the gate clock signal CPV are provided for the driving voltage generator 560. The data control signals include a horizontal synchronization start signal STH for instructing to begin outputting the gray signals, a load signal LOAD or TP for instructing to apply the appropriate data voltages to the data lines, an inversion control signal RVS for reversing polarity of the data voltages, and a data clock signal HCLK.

Responsive to the gate control signals from the signals controller 550, the gate driver 420 sequentially applies the gate-on pulses to the gate lines $G_1$-$G_n$, thereby sequentially turning on the switching elements Q connected thereto. In response to the data control signals from the signal controller 550, the data driver 430 supplies analog voltages from the gray voltage generator 570 corresponding to the entering gray signals R', G' and B' to the corresponding data lines $D_1$-$D_m$ as the data signals. Then, the data signals in turn are applied to the corresponding pixels via the turned-on switching elements Q. By performing this procedure, all gate lines $G_1$-$G_n$ are supplied with the gate-on pulses in a frame such that all pixel rows are supplied with the data signals. At that time, if the data signals for a frame are applied to the pixels in all rows and then the inversion control signal RVS makes the polarity of data signals for a next frame, which are applied to all rows, changed. Moreover, according to this embodiment of the present invention, normal data signals N and black data signals B are alternately applied to each pixel.

Then, an impulsive driving according to an embodiment of the present invention will be described in detail with reference to FIGS. 4 and 5.

Figure 4:
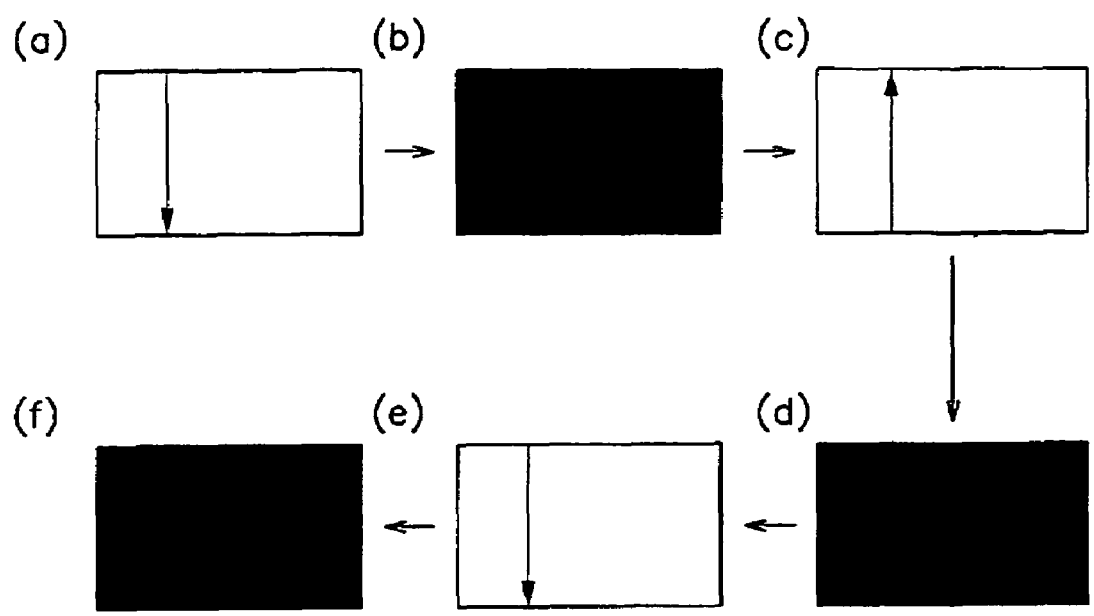
FIG. 4 illustrates an impulsive driving according to an embodiment of the present invention.
Figure 5:
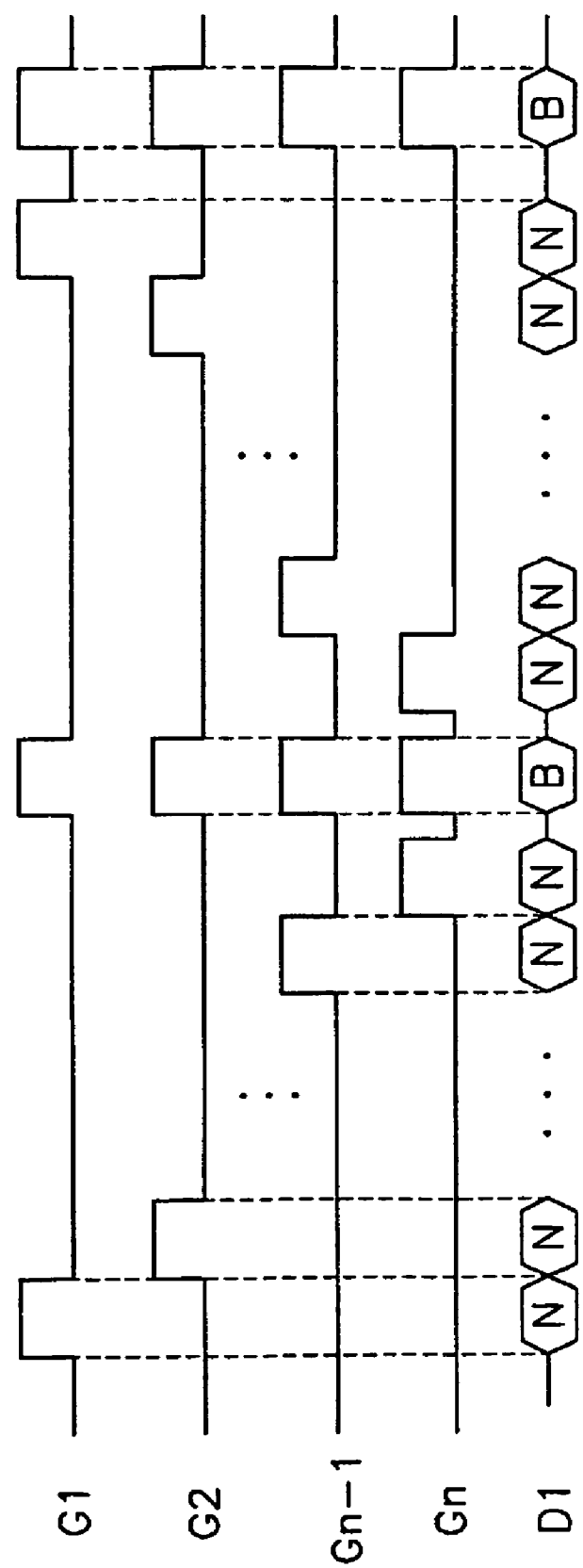
FIG. 5 shows waveforms of gate signals and data signals being applied in the impulsive driving shown in FIG. 4.

FIG. 4 illustrates an impulsive driving according to an embodiment of the present invention, and FIG. 5 shows waveforms of gate signals and data signals in the impulsive driving shown in FIG. 4.

The impulsive driving method in accordance with an embodiment of the present invention applies a gate-on voltage Von to all gate lines $G_1$-$G_n$ to turn on switching elements Q and applies a black data B to all pixels for a predetermined time after applying normal data signals N of a frame to the pixels. Scanning directions are changed alternately every fame, that is, from top to bottom, and then from bottom to top.

As shown in (a) of FIG. 4, in a first frame, the gate-on voltage Von is sequentially applied from the first gate line G1 to the last gate line Gn such that the normal data signals N corresponding to gray signals R', G' and B' are supplied for all pixels. Then, as shown in (b) of FIG. 4, the gate-on voltage Von is applied to all gate lines G1-Gn at the same time and the black data signal B is applied to the data lines D1-Dn to display an black image on the panel assembly 300. Since the normal data signals N are held until the black data signals B are applied, the normal data holding time becomes to gradually decease from the first row to the last row.

In a second frame, the normal data signals N are sequentially applied from the last row to the first row, in a direction opposite in the first frame (as shown in (c) of FIG. 4). Then, the gate-on voltage Von is applied to all gate lines G1-Gn at the same time and the black data signal B is applied to all pixels via the data lines D1-Dn (as shown in (d) of FIG. 4). Thereby, the data holding time becomes to gradually increase from the first row to the last row.

Accordingly, the data holding times of the pixels averaged over the two frames are equal.

As shown in (e) and (f) of FIG. 4, the alternate application of the normal data signals N and the black data signals B are repeated, in the same manner as (a) and (b) of FIG. 4.

According to an embodiment of the present invention, the polarity of the normal data signals N and the black data signals B are reversed every frame. For example, if the applied normal data signals in (a) of FIG. 4 have positive polarity, the applied normal data signals N in (c) of FIG. 4 have negative polarity and then the applied normal data signals N in (e) of FIG. 4 have positive polarity again. Similarly, if the black data signal B having positive polarity is applied in (b) of FIG. 4, the black data signal B having negative polarity is applied in (d) of FIG. 4 and then the black data signal B having positive polarity is applied in (f) of FIG. 4.

Referring to FIGS. 6-9, an impulsive driving of an LCD in accordance with an embodiment of the present invention will be described in detail.

Figure 6:
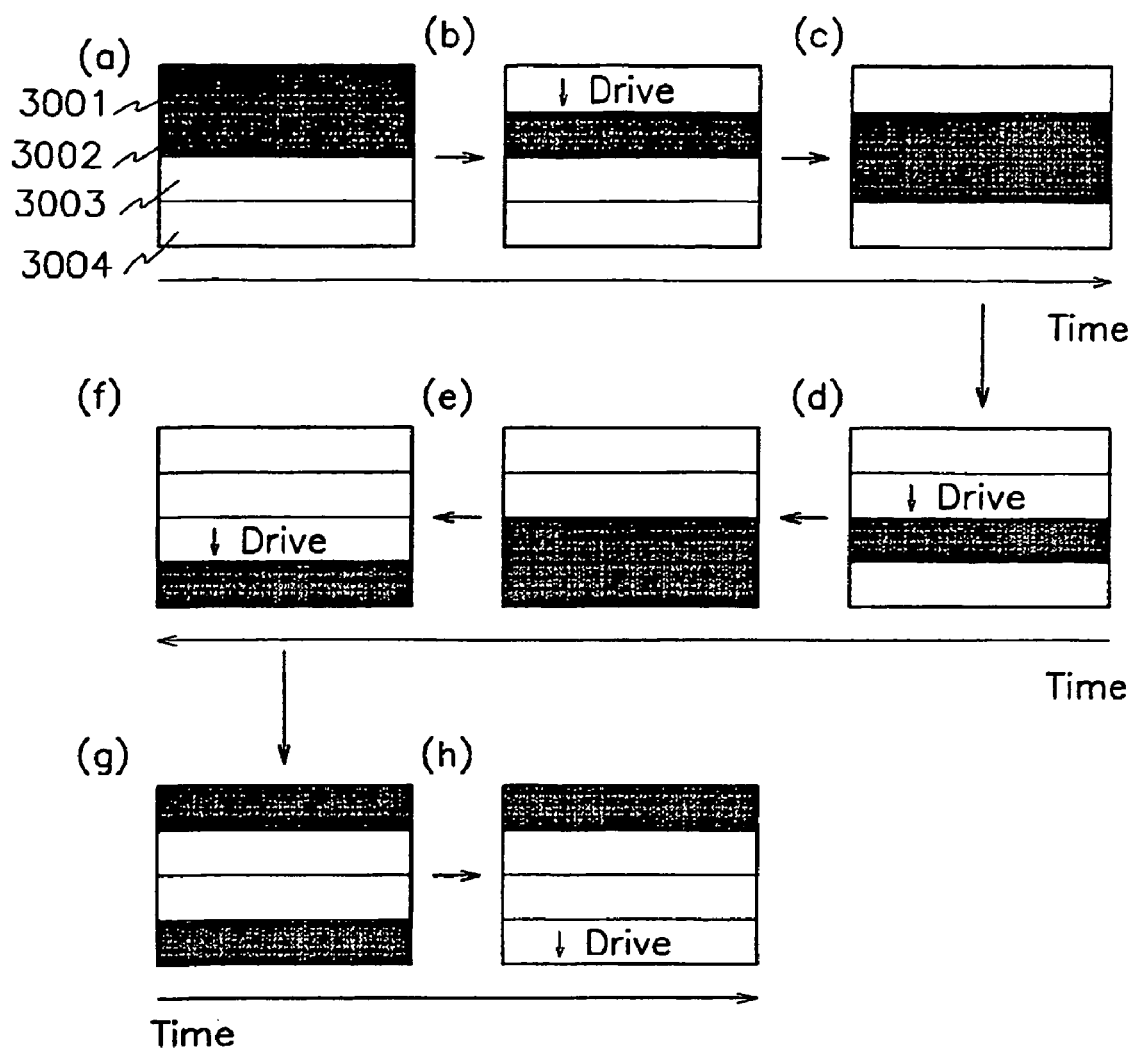
FIG. 6 shows scanning for a first frame in a driving method of an LCD according to another embodiment of the present invention.
Figure 7:
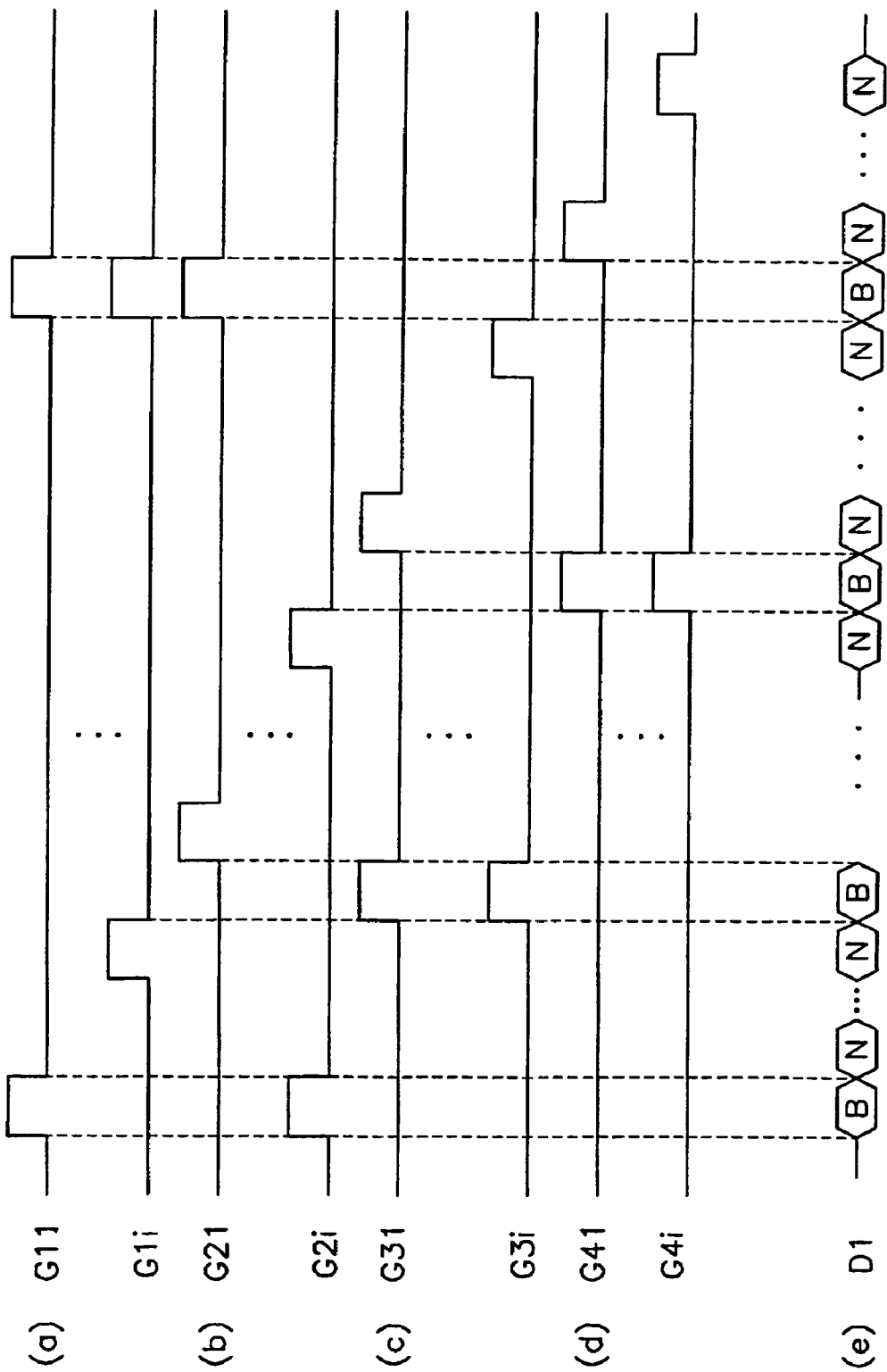
FIG. 7 shows waveforms of gate signals and data signals in the first frame shown in FIG. 6.

FIG. 6 shows scanning for a first frame in a driving method of an LCD according to another embodiment of the present invention, and FIG. 7 shows waveforms of gate signals and data signals in the first frame shown in FIG. 6.

Figure 8:
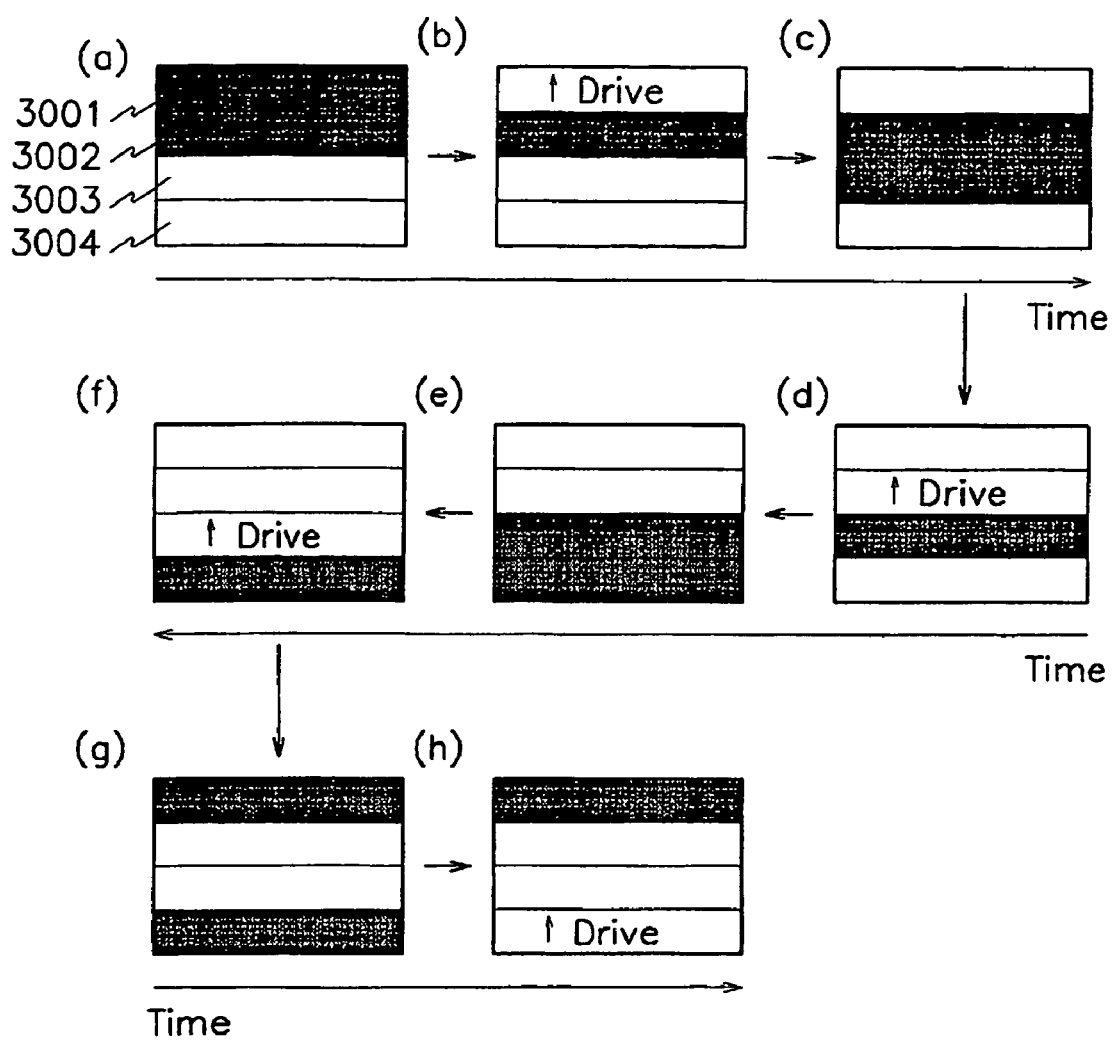
FIG. 8 shows scanning for a second frame in a driving method of an LCD according to another embodiment of the present invention.
Figure 9:
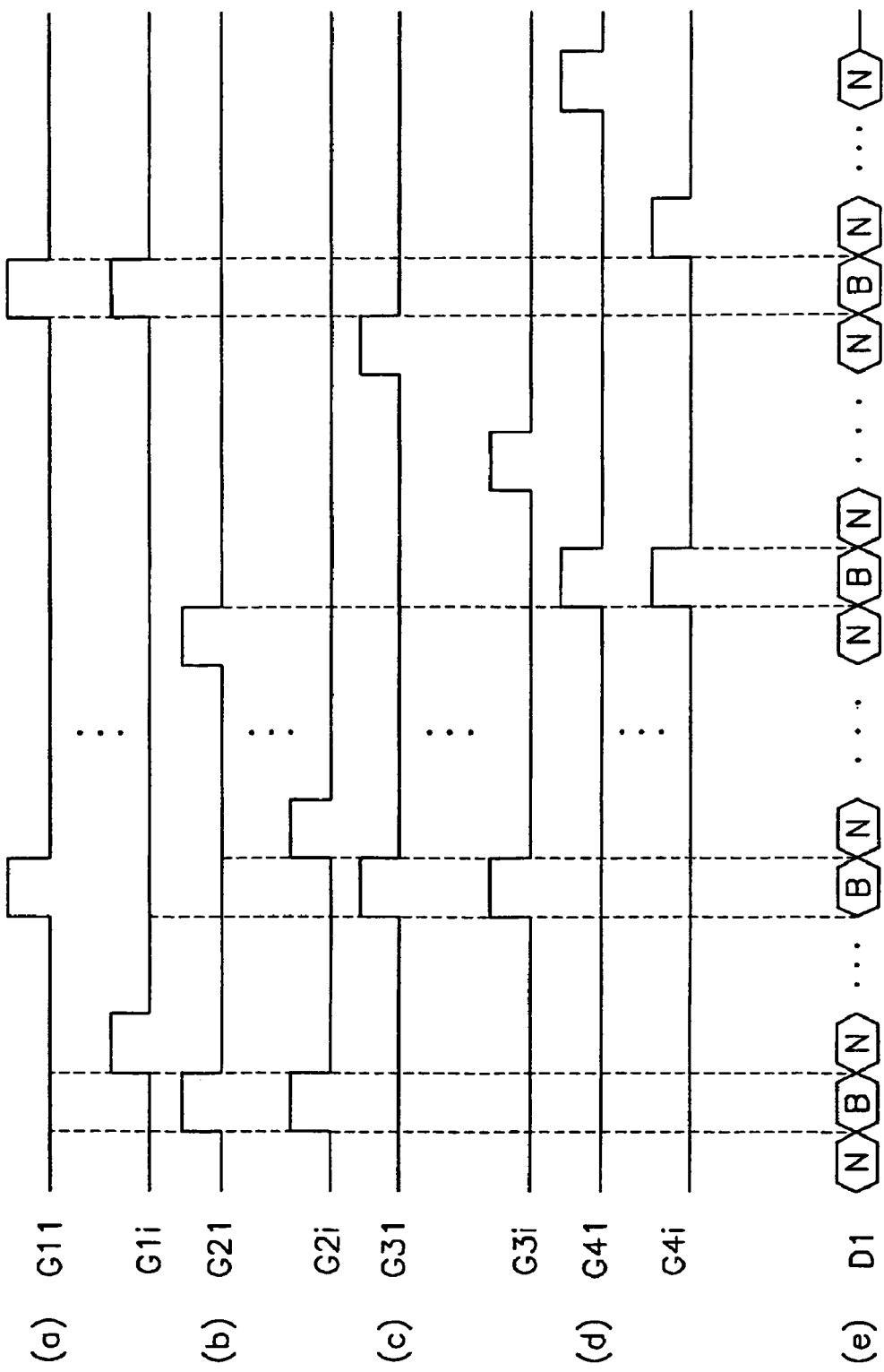
FIG. 9 shows waveforms of gate signals and data signals in the second frame shown in FIG. 8.

FIG. 8 shows scanning for a second frame in a driving method of an LCD according to another embodiment of the present invention, and FIG. 9 shows waveforms of gate signals and data signals in the second frame shown in FIG. 8.

Figure 3B:
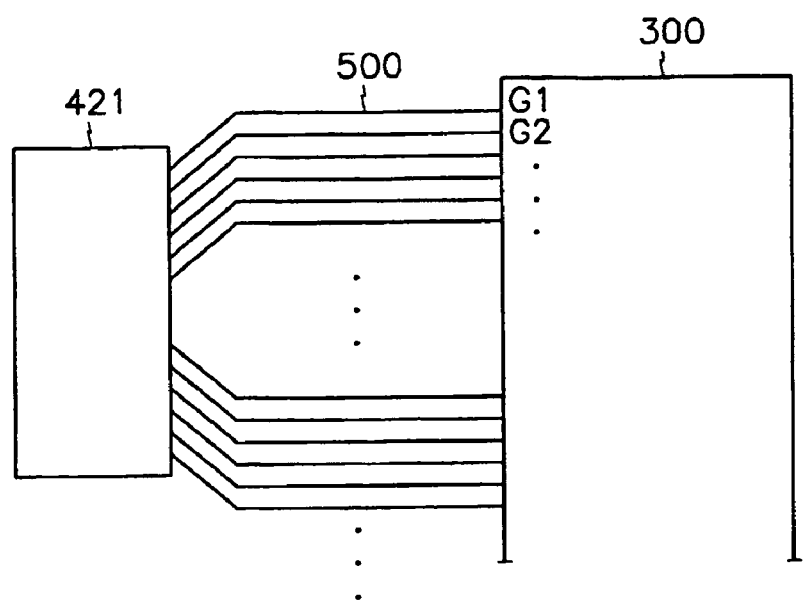
FIG. 3B shows a connection between a gate driving integrated circuit (IC) and a liquid crystal panel assembly according to an embodiment of the present invention.

For convenience, all gate lines G1-Gn are grouped into four groups G11-G1*i*, G21-G2*i*, G31-G3*i* and G41-G4*i* based on the connection to the gate driving ICs 421-424 shown in FIG. 3. That is, the gate lines of each gate line group G11-G1$i$, G21-G2$i$, G31-G3$i$ or G41-G4$i$ are connected only to a corresponding gate driving IC 421-424. Furthermore, the pixels are partitioned into four imaginary areas 3001-3004 based on the connection to the four gate line groups G11-G1$i$, G21-G2$i$, G31-G3$i$ and G41-G4$i$. That is, the pixels in different imaginary areas 3001-3004 are connected to different gate line groups G11-G1$i$ G21-G2$i$, G31-G3$i$ and G41-G4$i$, and connected to different gate driving ICs 421-424.

As shown in (a) of FIG. 6, the gate-on voltage Von is applied to all gate lines G21-G2$i$ for the second area 3002 at the same time and the black data signal B is applied to the data lines D1-Dm. At this time, the pixels in the remaining areas hold previously applied data signals.

Subsequently, as shown in (b) of FIG. 6, the first area 3001 is scanned from top to bottom for application of the normal data signals N. The second area 3002 holds the previously applied black data signal.

Next, as shown in (c) of FIG. 6, the gate-on voltage Von is applied to all gate lines G31-G3$i$ connected to the third gate driving IC 423 at the same time, and then the black data signal B is applied to the third area 3003. At this time, the first area 3001 holds the normal data signals N and the second area 3002 holds the black data signal B.

As shown in (d) of FIG. 6, the second area 3002 connected to the second gate driving IC 422 is scanned from top to bottom for application of the normal data signals N. The pixels in the first area 3001 hold the normal data signal N and those of the third area 3003 hold the black data signal B.

As shown in (e) of FIG. 6, the gate-on voltage Von is applied to the gate lines G41-G4$i$ of the fourth area 3004 connected to the fourth gate driving IC 424 at the same time and the black data signal B is applied to the pixels of thereof such that the fourth area 3004 is in a black state. At this time, the first and the second areas 3001 and 3002 hold the normal data signals N, and the third area 3003 holds the black data signal B.

As shown in (f) of FIG. 6, the third area 3003 connected to the third gate driving IC 423 and thus connected to the gate lines G31-G3$i$ is scanned from top to bottom for application of the normal data signals N. The first and the second areas 3001 and 3002 hold the normal data signals N and the fourth area 3004 holds the black data signal B.

As shown in (g) of FIG. 6, the gate-on voltage Von is applied to gate lines G11-G1$i$ for the first area 3001 connected to the first gate driving IC 421 at the same time and the black data signal B is applied to the first area 3001 to be in a black state. At this time, the second and the third areas 3002 and 3003 hold the normal data signals N and the fourth area 3004 holds the black data signal B.

Finally, as shown in (h) of FIG. 6, the fourth area 3004 connected to the fourth gate driving IC 424 and thus connected to the gate lines G41-G4$i$ is scanned from top to bottom for application of the normal data signals N. The first area 3001 holds the black data signal B and the second and the third areas 3002 and 3003 hold the normal data signals N.

In this manner, when a frame is completed, a next frame starts. A scanning direction within each area 3001-3004 is opposite to a scanning direction in the previous frame, that is, from bottom to top.

At that time, the inverse control signal RVS is applied to the data driver 430 such that the polarity of the normal and the black data signals N and B are reversed.

Now, referring to FIGS. 8 and 9, the scanning of the next frame will be described.

The scanning of the next frame proceeds from the first area 3001 to the fourth area 3004 as the previous frame, but a scanning direction in each area 3001-3004 is from bottom to top. Except for the scanning direction, the scanning is similar to that described with reference to FIG. 6 and the detailed description thereof is omitted.

In this embodiment of the present invention, the number of the areas holding the black data signal B is two to enhance the effect of the impulsive driving, but the number may be one or three. However, it is preferable to hold the black data signal on an area equal to or larger than 50% of the total display area.

In addition, the gate driver 420 according to this embodiment of the present invention has the four gate driving ICs 421-424, but also the number of the gate driving ICs may be varied. Moreover, the areal partition is made such that one area corresponds to one gate driving IC, but may be made such that one area corresponds to two or more gate driving ICs.

As described above, the impulsive driving using a black data signal reverses the scanning direction for a frame compared with a previous frame such that holding times of the normal data signals and the black data signals for all pixels are uniform. Therefore, image quality of an LCD panel becomes uniform to be improved.

Furthermore, the LCD panel assembly is partitioned into a plurality of imaginary areas, and the scanning in each area proceeds in opposition to the scanning of the previous frame. As a result, it is possible to decrease the difference in the normal data holding time and the black data holding time between the pixels near the center and near the edges of the panel assembly, thereby preventing flicker and improving image quality of the panel assembly.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A liquid crystal display comprising:
    a liquid crystal panel assembly including a first, a second and a third scanning area, each of the scanning areas including a plurality of gate lines connected to a plurality of pixels which include switching elements connected to the gate lines and data lines;
    a gate driver applying a voltage to the gate lines for turning on the switching elements;
    a data driver selecting gray voltages corresponding to gray signals and applying the selected gray voltages to the pixels via the data lines as data signals, each of the data signals including normal data signals and a black data signal; and
    a signal controller providing the gray signals and control signals for controlling the gate driver and the data driver, wherein, in one frame period, the signal controller controls the gate driver and the data driver such that the black data signal is applied to pixels connected to gate lines of the second scanning area while gate-on voltages are applied to the gate lines of the second scanning area and then, the normal data signals are applied to pixels connected to gate lines of the first scanning area while gate-on voltages are sequentially applied to the gate lines of the first scanning area in an arranging direction in which the gate lines are arranged;

the signal controller controls the gate driver and the data driver such that, in said one frame period, gate-on voltages are applied to gate lines of the third scanning area after the gate-on voltage is applied to the last gate line of the first scanning area and then the black data signal is applied to pixels connected to the gate lines of the third scanning area, wherein, in a frame period next to said one frame period, the signal controller controls the gate driver and the data driver such that the black data signal is applied to pixels connected to gate lines of the second scanning area while gate-on voltages are applied to the gate lines of the second scanning area and then, the normal data signals are applied to the pixels connected to gate lines of the first scanning area while gate-on voltages are sequentially applied to the gate lines of the first scanning area in a direction opposite to the arranging direction of the gate lines.

2. The liquid crystal display of claim 1, wherein the black data signal is simultaneously applied to the pixels in one of the scanning areas.

3. The liquid crystal display of claim 1, wherein, while gate-on voltages are applied to one of the scanning areas, pixels connected to gate lines of the other of the scanning areas hold previous data signals.

4. The liquid crystal display of claim 1, wherein the liquid crystal display is in an optically compensated bend mode.

5. The liquid crystal display of claim 1, wherein, in the frame period next to said one frame period,
the signal controller controls the gate driver and the data driver such that gate-on voltages are applied to gate lines of the third scanning area after the gate-on voltage is applied to the last gate line of the first scanning area and then the black data signal is applied to the pixels connected to the gate lines of the third scanning area in the frame period next to said one frame period.

6. The liquid crystal display of claim 5, wherein polarity of voltages of the normal data signals applied in said one frame period is opposite to polarity of the normal data voltages applied in the frame period next to said one frame period.

7. The liquid crystal display of claim 5, wherein polarity of a voltage of the black data signal applied in said one frame period is opposite to polarity of a voltage of the black data signal applied in the frame period next to said one frame period.

8. The liquid crystal display of claim 5, wherein a holding period, in which the pixels hold the normal data signals, averaged over two adjacent frames is uniform.

9. The liquid crystal display of claim 1, wherein pixels connected to one of the gate lines are arranged in a direction perpendicular to the arranging direction of the gate lines.

10. The liquid crystal display of claim 1, wherein
the gate driver includes a plurality of gate driving devices;
the gate driving devices are connected to the gate lines; and
the pixels are connected to the gate driving devices through the gate lines, respectively.

11. The liquid crystal display of claim 1, wherein the signal controller further controls the gate driver and the data driver such that equal to or more than 50% of the pixels in the scanning areas hold the black data signal.

12. The liquid crystal display of claim 1, wherein, in said one frame period, the signal controller further controls the gate driver and the data driver such that the normal data signals are applied to the pixels connected to gate lines of the second scanning area after the black data signal is applied to pixels connected to the gate lines of the third scanning area.

13. A method of driving a liquid crystal panel assembly including
a first, a second and a third scanning area, each of the scanning areas including a plurality of gate lines connected to a plurality of pixels which includes switching elements connected to the gate lines and data lines; a gate driver applying a voltage to the gate lines for turning on the switching elements; a data driver selecting gray voltages corresponding to gray signals and applying the selected gray voltages to the pixels via the data lines as data signals, each of the data signals including normal data signals and a black data signal; and a signal controller providing the gray signals and control signals for controlling the gate driver and the data driver, the method comprising:
applying, in one frame period, the black data signal to pixels connected to gate lines of the second scanning area while gate-on voltages are applied to the gate lines of the second scanning area;
then, applying, in said one frame period, the normal data signals to the pixels connected to gate lines of the first scanning area while gate-on voltages are sequentially applied to the gate lines of the first scanning area in an arranging direction in which the gate lines are arranged;
applying, in said one frame period, gate-on voltages to gate lines of the third scanning area after the gate-on voltage is applied to the last gate line of the first scanning area;
applying the black data signal to the pixels connected to the gate lines of the third scanning area in said one frame period,
applying, in a frame period next to said one frame period, the black data signal to pixels connected to gate lines of the second scanning area while gate-on voltages are applied to the gate lines of the second scanning area; and
then, applying, in the frame period next to said one frame period, the normal data signals to the pixels connected to gate lines of the first scanning area while gate-on voltages are sequentially applied to the gate lines of the first scanning area in a direction opposite to the arranging direction of the gate lines.

14. The method of claim 13, further comprising:
after applying, in the frame period next to said one frame period, the normal data signals to the pixels in the first scanning area,
then applying gate-on voltages to gate lines of the third scanning area after the gate-on voltage is applied to the last gate line of the first scanning area and applying the black data signal to the pixels connected to the gate lines of the third scanning area in the frame period next to said one frame period.

15. The method of claim 14, wherein polarity of voltages of the normal data signals applied in said one frame period is opposite to polarity of the normal data voltages applied in the frame period next to said one frame period.

16. The method of claim 14, wherein polarity of a voltage of the black data signal applied in said one frame period is opposite to polarity of a voltage of the black data signal applied in the frame period next to said one frame period.

17. The method of claim 13, wherein equal to or more than 50% of the pixels in the scanning areas hold the black data signal.

18. The method of claim 13, further comprising, applying the normal data signals to the pixels connected to gate lines of the second scanning area in said one frame period after the black data signal is applied to pixels connected to the gate lines of the third scanning area.

* * * * *